(12) United States Patent
Heliot et al.

(10) Patent No.: US 9,045,967 B2
(45) Date of Patent: Jun. 2, 2015

(54) SYSTEM AND METHOD FOR CONTROLLING AND MONITORING A DRILLING OPERATION USING REFINED SOLUTIONS FROM A PANISTIC INVERSION

(75) Inventors: Denis Heliot, Sugar Land, TX (US); Steven F. Crary, Sugar Land, TX (US); Jean Seydoux, Rio de Janeiro (BR)

(73) Assignee: Schlumberger Technology Corporation, Sugar Land, TX (US)

( * ) Notice: Subject to any disclaimer, the term of this patent is extended or adjusted under 35 U.S.C. 154(b) by 952 days.

(21) Appl. No.: 13/191,354

(22) Filed: Jul. 26, 2011

(65) Prior Publication Data
US 2013/0025939 A1 Jan. 31, 2013

(51) Int. Cl.
E21B 44/00 (2006.01)
E21B 47/022 (2012.01)

(52) U.S. Cl.
CPC .............. E21B 44/00 (2013.01); E21B 47/022 (2013.01)

(58) Field of Classification Search
None
See application file for complete search history.

(56) References Cited

U.S. PATENT DOCUMENTS 6,714,009 B2 * 3/2004 Heidler ........................ 324/303
7,065,004 B2 * 6/2006 Jiao et al. ..................... 367/51
2007/0168133 A1 7/2007 Bennett et al.
2008/0059075 A1 * 3/2008 Colombo et al. ............... 702/18
2008/0201079 A1 8/2008 Castillo et al.
2009/0217788 A1 9/2009 Hunter
2011/0153217 A1 6/2011 Rodney

FOREIGN PATENT DOCUMENTS

WO 2011044028 A2 4/2011

OTHER PUBLICATIONS

Omeragic, et al., "Real-Time Interpretation of Formation Structure from Directional EM Measurements", SPWLA 47 Annual Logging Symposium, Veracruz, Mexico, 2006, 14 pages.
International Search Report and Written Opinion of the International Searching Authority of PCT International Patent Application No. PCT/US2012/047018 dated Jan. 30, 2013.

* cited by examiner

*Primary Examiner* — Aditya Bhat
(74) *Attorney, Agent, or Firm* — Kimberly Ballew

(57) ABSTRACT

During a drilling operation, measured data from the drilling operation may be received with a panistic inversion and risk estimate module. The panistic inversion and risk estimate module may generate a plurality of mathematical solutions from a panistic inversion that uses the measured data and one or more earth models. The one or more earth models having various parameters may be selected prior to drilling and/or while the drilling operation occurs. For each solution of the plurality of mathematical solutions generated from the panistic inversion, the panistic inversion and risk estimate module may determine if the measured data exceeds one or more probability risk thresholds associated with the drilling operation. If the measured data exceeds the probability risk threshold associated with the drilling operation, then the panistic inversion and risk estimate module may generate an alert.

20 Claims, 8 Drawing Sheets

SYSTEM AND METHOD FOR CONTROLLING AND MONITORING A DRILLING OPERATION USING REFINED SOLUTIONS FROM A PANISTIC INVERSION

DESCRIPTION OF THE RELATED ART

Forward-model-based inversion techniques have been used for many years to help interpret downhole log measurements of drilling operations. Prior to and during drilling operations, earth formations may be represented by one or more earth models, with each earth model having a series of layers with different properties and a corresponding parameters. Forward modeling is typically used to compute the expected response of a particular earth model, which can be compared to the actual measurements taken during a drilling operation. As understood by one of ordinary skill in the art, inversions may allow one to determine the parameters of an earth model, such as the number(s) and position(s) of earth layer boundaries, as well as values of the properties in each earth layer.

The number of parameters needed to accurately describe formations in earth layers is often larger than the number of independent measurements available. For the measurements that are available, inversions may be used. However, the earth models used in conventional inversions are usually simplified. Furthermore, the sensitivity of the measurements to some of the parameters of a particular earth model may be limited when such conventional inversions are used.

Hence, scientists in the industry have developed several different conventional problem-specific parametric inversion schemes that include simplifications of the earth model, sequential inversion on sub-set of parameters, elaborate cost functions, constraints, etc. Simplifications of the earth model can result in models that are too simplified. For example, bed and shoulder resistivities and bed thickness may vary along a well path. Meanwhile, the simplification of an earth model may reflect constant bed and shoulder resistivities as well as bed thickness. The reliance of these simplified models may result in a less than optimal geo-steering decision.

Further, these conventional specific parametric inversion schemes are designed to produce a single or one unique "best solution" that fits the data being measured during a drilling operation. This unique "best solution" may then be used for Formation Evaluation purposes—that is, the unique and single solution is used as input to downstream processing and algorithms that determine the best estimate of parameters for properties like volumetrics (that include porosity, saturation, mineral composition, etc.) and ultimately the best estimate of oil reserves within a given geographic region.

As understood by one of ordinary skill in the art, these inversion techniques have been used in the last decade with electromagnetic ("EM") measurements for well placement purpose. In these cases, a single best solution from the inversion is traditionally used to determine the position of the tool with respect to the earth formation layers—typically the distance to the shale formation—so as to geo-steer the well and keep it in a "pay" zone. Various methods exist to quantify the uncertainty of the parameter values around the best solution (i.e.—sensitivity matrixes such as Jacobian, model covariance matrix, model resolution matrix, etc.).

Putting these single solutions aside, one of ordinary skill in the art recognizes that drilling a well is a complex operation that requires a lot of decisions to be made and risks to be managed. On the one hand, the faster one drills into the earth, on some levels, the cheaper it is for such a drilling operation. On the other hand, drilling into a high-pressure zone because drilling is occurring too quickly and without considering risks for the path the of the drilling system may result in catastrophic losses.

Accordingly, what is needed in the art is a risk based management approach that identifies and quantifies a probability of the best and worst case scenarios from a plurality of (numerous) possible solutions. In other words, a system and method which does not rely on only a single best solution from an inversion of measured data is needed in the art to allow for efficient geo-steering and geo-stopping during a drilling operation.

SUMMARY OF THE DISCLOSURE

A method and system for monitoring and controlling a drilling operation are described. The method includes using one or more parameters for defining a probability risk threshold associated with the drilling operation. Such parameters may include those that are usually determined prior to drilling. These parameters include, but are not limited to, default values or job-specific values determined during the job-planning phase for a drilling operation. These one or more parameters may also be defined while the drilling operation occurs.

During drilling, measured data from the drilling operation may be received with a panistic inversion and risk estimate module. A panistic inversion includes inversion schemes that output multiple probably solutions that explain input data, noting that each of those solutions can be associated with a probability. The panistic inversion and risk estimate module may generate a plurality of mathematical solutions from a panistic inversion that uses the measured data and one or more earth models. The one or more earth models having various parameters may be selected prior to drilling and/or while the drilling operation occurs. The method may further include refining a number of the plurality of mathematical solutions by eliminating those solutions which are substantially outside of the data specific to the desired geographic region. The panistic inversion may include a Monte-Carlo type inversion. In other words, a Monte-Carlo inversion is one instance of a panistic inversion as defined herein.

The plurality of mathematical solutions generated from the panistic inversion module may produce statistics for the parameters selected for the drilling operation. Those solutions may be used to compute one or more probability risk estimates/thresholds associated with the specific events during the drilling operation. If probability risk exceeds a given threshold associated with the drilling operation, then the panistic inversion and risk estimate module may generate an alert.

The alert may comprise an audible or visual one. The alert may be generated on a portable computing device, such as laptop computer or smart phone.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1A:
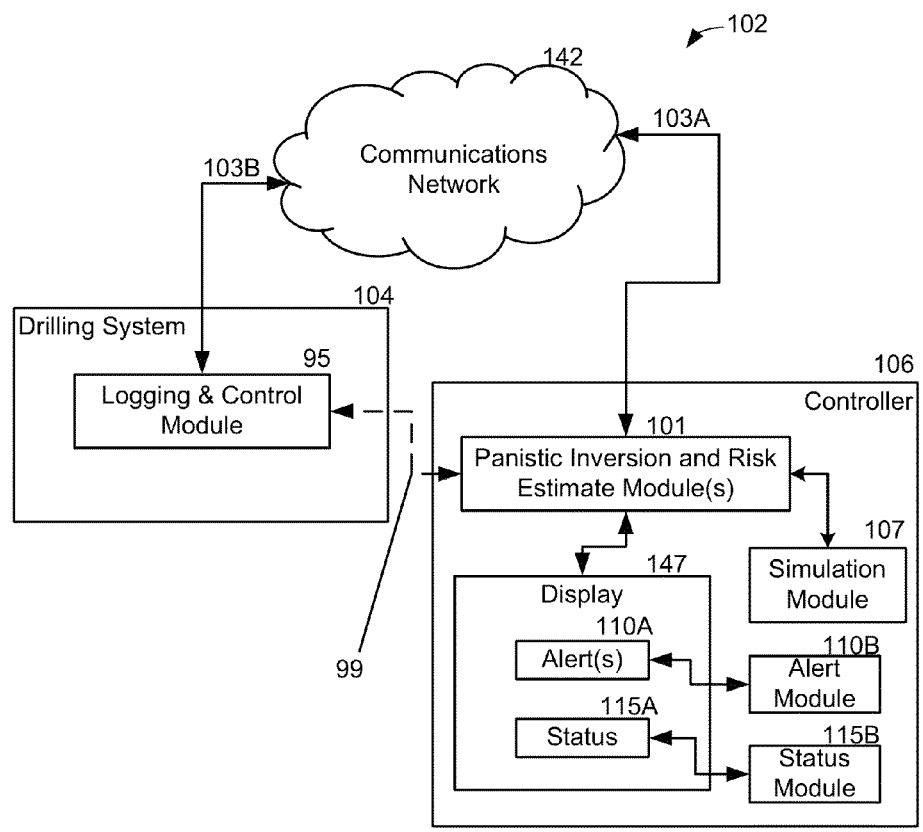
FIG. 1A is a diagram of a system for controlling and monitoring a drilling operation using refined solutions from a panistic inversion.

Referring initially to FIG. 1A, this figure is a diagram of a system 102 for controlling and monitoring a drilling operation using refined solutions from a panistic inversion. The system 102 comprises a panistic inversion and risk estimate module 101 and a simulation module 107 forming part of a controller 106. The system 102 also includes a drilling system 104 which has a logging and control module 95. The controller 106 further comprises a display 147 for conveying alerts 110A and status information 115A that are produced by an alerts module 110B and a status module 115B. The controller 102 may communicate with the drilling system 104 via a communications network 142.

The controller 102 and the drilling system 104 may be coupled to the communications network 142 via communication links 103. Many of the system elements illustrated in FIG. 1A are coupled via communications links 103 to the communications network 142.

The links 103 illustrated in FIG. 1A may comprise wired or wireless couplings or links. Wireless links include, but are not limited to, radio-frequency ("RF") links, infrared links, acoustic links, and other wireless mediums. The communications network 142 may comprise a wide area network ("WAN"), a local area network ("LAN"), the Internet, a Public Switched Telephony Network ("PSTN"), a paging network, or a combination thereof. The communications network 142 may be established by broadcast RF transceiver towers (not illustrated). However, one of ordinary skill in the art recognizes that other types of communication devices besides broadcast RF transceiver towers are included within the scope of this disclosure for establishing the communications network 142.

The drilling system 104 and controller 106 of the system 102 may have RF antennas so that each element may establish wireless communication links 103 with the communications network 142 via RF transceiver towers (not illustrated). Alternatively, the controller 106 and drilling system 104 of the system 102 may be directly coupled to the communications network 142 with a wired connection. The controller 106 in some instances may communicate directly with the drilling system 104 as indicated by dashed line 99 or the controller 106 may communicate indirectly with the drilling system 104 using the communications network 142.

The panistic inversion and risk estimate module 101 may comprise software or hardware (or both). The panistic inversion and risk estimate module 101 may generate the alerts 110A that may be rendered on the display 147. The alerts 110A may be visual in nature but they may also comprise audible alerts as understood by one of ordinary skill in the art. The alerts 110A may be based on a plurality of refined solutions from an actual panistic inversion, which typically includes one or more mathematical calculations. Further details about the panistic inversion and risk estimate module 101 will be described below in connection with FIGS. 2-3.

The simulation module 107 may also comprise software or hardware (or both). The simulation module 107 may generate simulation data that is processed by the panistic inversion and risk estimate module 101 to evaluate certain risk thresholds used during a drilling operation. Further details of the simulation module 107 and its corresponding functions will be described below in connection with FIG. 5

The display 147 may comprise a computer screen or other visual device. The display 147 may be part of a separate stand-alone portable computing device that is coupled to the logging and control module 95 of the drilling system 104. The logging and control module 95 may comprise hardware or software (or both) for direct control of a borehole assembly 100 as understood by one of ordinary skill in the art.

Figure 1B:
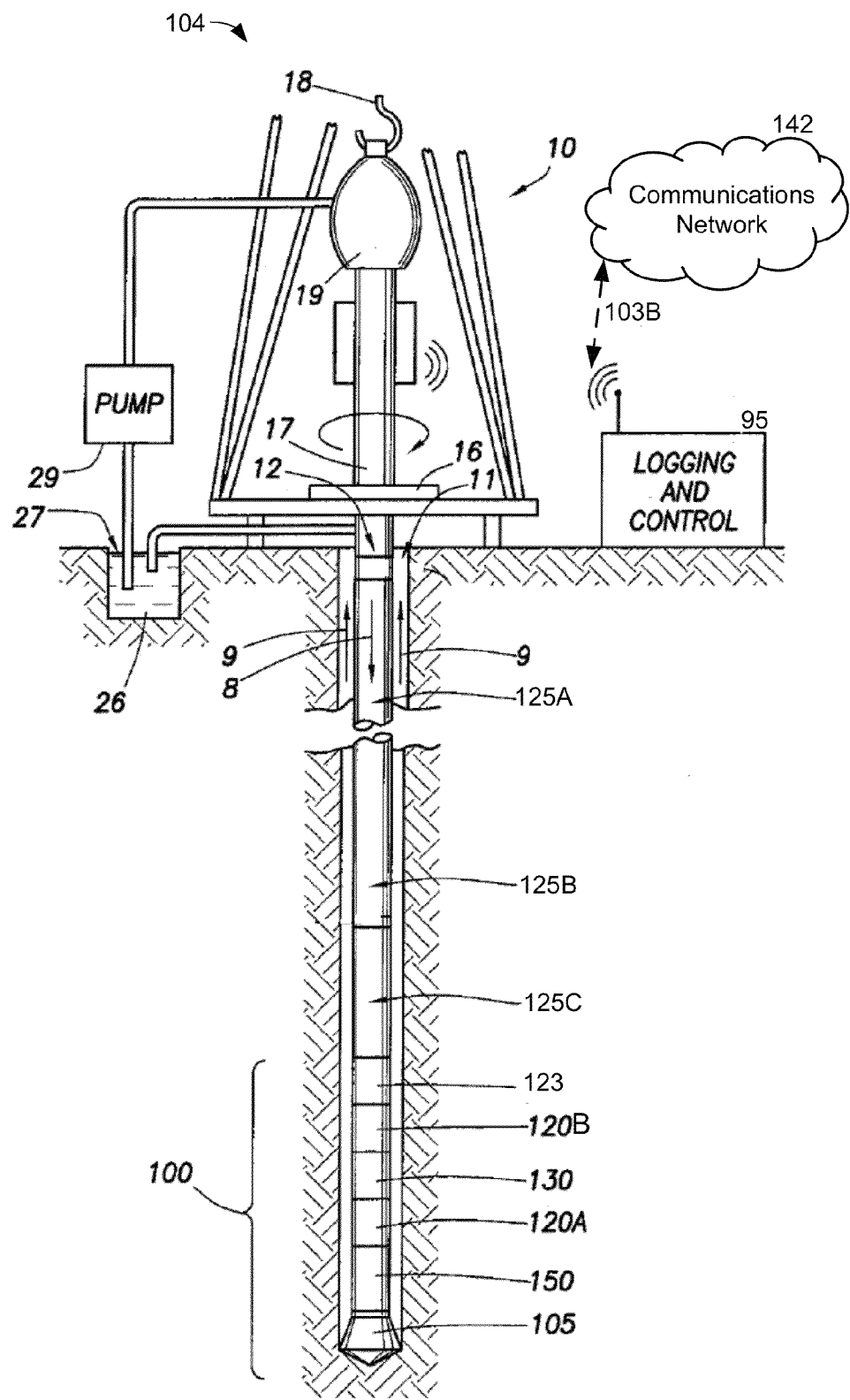
FIG. 1B is a diagram of a wellsite drilling system that forms part of the system illustrated in FIG. 1A.

FIG. 1B illustrates a wellsite drilling system 104 that forms part of the system 102 illustrated in FIG. 1A. The wellsite can be onshore or offshore. In this exemplary system 104, a borehole 11 is formed in subsurface formations by rotary drilling in a manner that is known to one of ordinary skill in the art. Embodiments of the system 104 can also use directional drilling, as will be described hereinafter. The drilling system 104 comprises the logging and control module 95 as discussed above in connection with FIG. 1A.

A drill string 12 is suspended within the borehole 11 and has a bottom hole assembly ("BHA") 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string 12 relative to the hook 18. As is known to one of ordinary skill in the art, a top drive system could alternatively be used instead of the kelly 17 and rotary table 16 to rotate the drill string 12 from the surface. The drill string 12 may be assembled from a plurality of segments 125 of pipe and/or collars threadedly joined end to end.

In the exemplary embodiment of FIG. 1B, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this system as understood by one of ordinary skill in the art, the drilling fluid 26 lubricates the drill bit 105 and carries formation cuttings up to the surface as it is returned to the pit 27 for cleaning and recirculation.

The bottom hole assembly 100 of the illustrated embodiment may include a logging-while-drilling (LWD) module 120, a measuring-while-drilling (MWD) module 130, a roto-steerable system and motor, and drill bit 105.

The LWD module 120 is housed in a special type of drill collar, as is known to one of ordinary skill in the art, and can contain one or a plurality of known types of logging tools. It will also be understood that more than one LWD 120 and/or MWD module 130 can be employed, e.g. as represented at 120A. (References, throughout, to a module at the position of 120A can alternatively mean a module at the position of 120B as well.) The LWD module 120 includes capabilities for measuring, processing, and storing information, as well as for communicating with the surface equipment. In the present embodiment, the LWD module 120 includes a directional resistivity measuring device.

The MWD module 130 is also housed in a special type of drill collar, as is known to one of ordinary skill in the art, and can contain one or more devices for measuring characteristics of the drill string 12 and drill bit 105. The MWD module 130 may further includes an apparatus (not shown) for generating electrical power to the downhole system 100.

This apparatus may typically include a mud turbine generator powered by the flow of the drilling fluid 26, it being understood by one of ordinary skill in the art that other power and/or battery systems may be employed. In the exemplary embodiment, the MWD module 130 includes one or more of the following types of measuring devices: a weight-on-bit measuring device, a torque measuring device, a vibration measuring device, a shock measuring device, a stick slip measuring device, a direction measuring device, and an inclination measuring device.

The foregoing examples of wireline and drill string conveyance of a well logging instrument are not to be construed as a limitation on the types of conveyance that may be used for the well logging instrument. Any other conveyance known to one of ordinary skill in the art may be used, including without limitation, slickline (solid wire cable), coiled tubing, well tractor and production tubing.

Figure 1C:
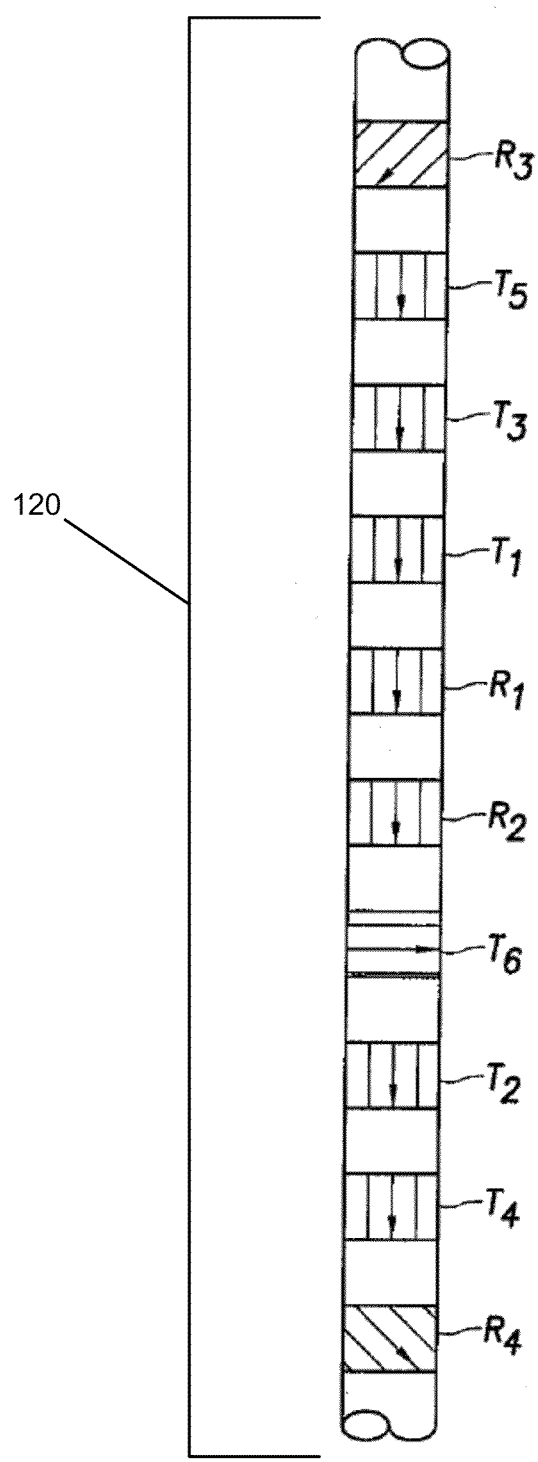
FIG. 1C is a diagram of a directional deep-reading logging-while-drilling ("LWD") drilling tool that is part of the wellsite drilling system of FIG. 1B.

FIG. 1C depicts a directional deep-reading logging-while-drilling ("LWD") drilling tool 120 as illustrated in FIG. 1B. Signals from tools 120 having axially aligned cylindrically symmetrical coils are usually not directionally sensitive. The tool of FIG. 1C provides tilted and transverse coils to obtain directionally sensitive measurements. The sensor array includes six transmitter antennas (T1-T6) and four receiver antennas (R1-R4). Five transmitter antennas (T1 through T5) are arranged axially along the length of the tool. A sixth transmitter antenna (T6) is oriented transverse to the tool axis.

A receiver antenna (R3, R4) is positioned at each end of the tool. This pair of receiver antennas (R3 and R4) brackets the transmitters, and each of these receivers is tilted at about 45 degrees to the tool axis. An additional pair of receiver antennas (R1 and R2), located in the center of the transmitter array, is arranged axially and can obtain conventional type propagation resistivity measurements. The antennas may operate at 2 MHz and 400-kHz standard operating frequencies as well as 100-kHz frequencies as understood by one of ordinary skill in the art.

The described arrangement of FIG. 1C produces a preferential sensitivity to conductivity on one side of the tool 120. As the tool 120 rotates, its sensors can detect nearby conductive zones and register the direction from which maximum conductivity can be measured. Magnetometers and accelerometers can provide reference directional orientation data for the tool. In addition to its directional capability, the tool provides relatively deeper measurements than most conventional LWD resistivity tools 120. The tool 120 may detect dip, anisotropy, and formation boundaries.

The substantially real-time bidirectional drill string telemetry hereof, in conjunction with the capabilities of the directional resistivity logging tool, as described, improves performance of geo-steering by increasing the amount of data at the surface and the speed and precision of directional drilling control.

Figure 1D:
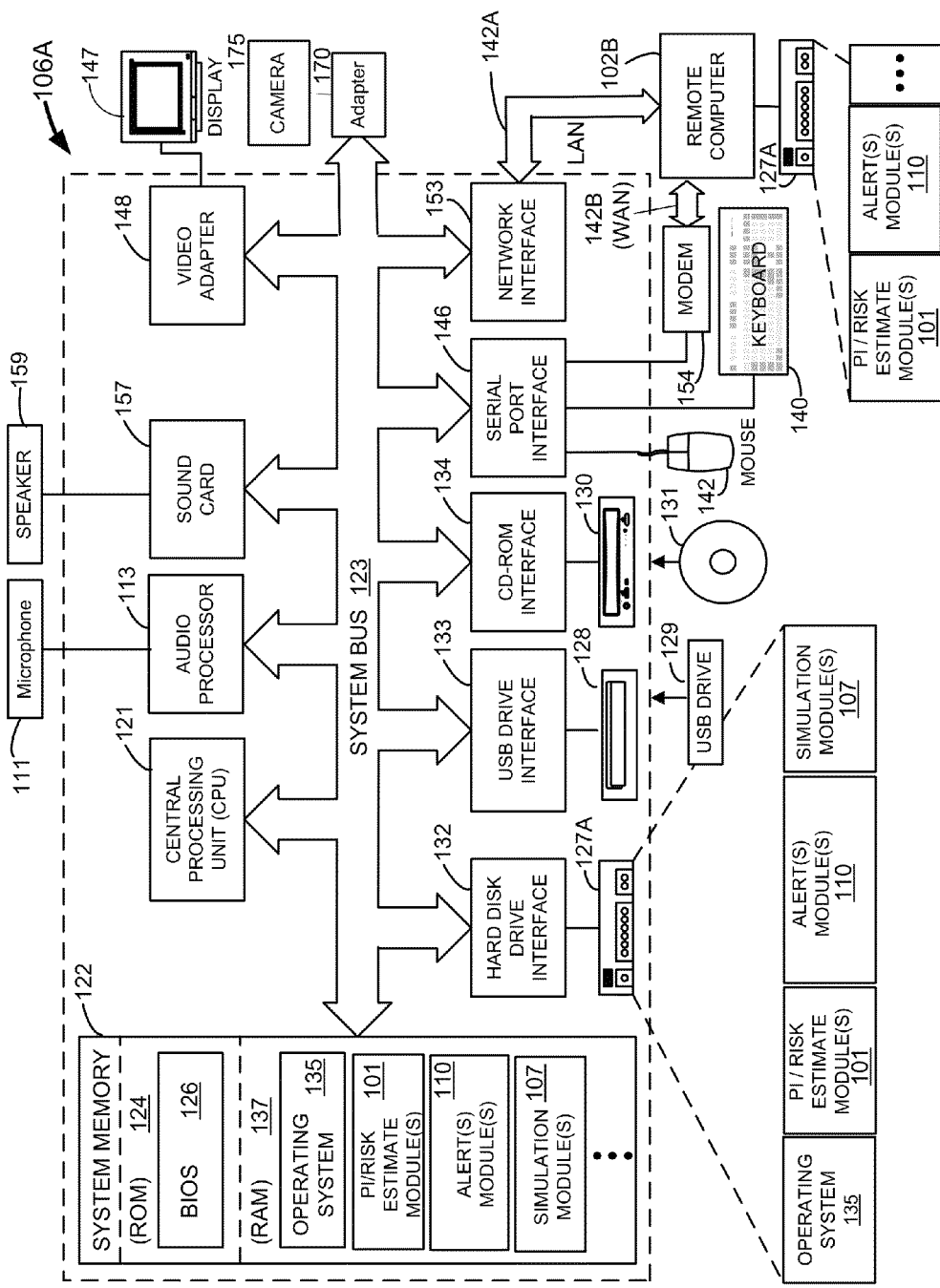
FIG. 1D is a diagram of main components for an exemplary controller illustrated in FIG. 1A.

FIG. 1D is a diagram of some main components for an exemplary controller 106 for the wellsite drilling system 104 of FIG. 1A. The exemplary operating environment for the controller 106 may include a general-purpose computing device in the form of a conventional computer as understood by one of ordinary skill in the art.

Generally, the computer forming the controller 106 includes a central processing unit 121, a system memory 122, and a system bus 123 that couples various system components including the system memory 122 to the processing unit 121.

The system bus 123 may be any of several types of bus structures including a memory bus or memory controller, a peripheral bus, and a local bus using any of a variety of bus architectures. The system memory includes a read-only memory ("ROM") 124 and a random access memory ("RAM") 127. A basic input/output system ("BIOS") 126, containing the basic routines that help to transfer information between elements within computer, such as during start-up, is stored in ROM 124.

The computer 106 can include a hard disk drive 127A for reading from and writing to a hard disk, not shown, a USB port 128 for reading from or writing to a removable USB drive 129, and an optical disk drive 130 for reading from or writing to a removable optical disk 131 such as a CD-ROM, a DVD, or other optical media. Hard disk drive 127A, USB drive 129, and optical disk drive 130 are connected to system bus 123 by a hard disk drive interface 132, a USB drive interface 133, and an optical disk drive interface 134, respectively.

Although the exemplary environment described herein employs hard disk 127A, removable USB drive 129, and removable optical disk 131, it should be appreciated by one of ordinary skill in the art that other types of computer readable media which can store data that is accessible by a computer, such as magnetic cassettes, flash memory cards, digital video disks, Bernoulli cartridges, RAMs, ROMs, and the like, may also be used in the exemplary operating environment without departing from the scope of the system 102. Such uses of other forms of computer readable media besides the hardware illustrated will be used in internet connected devices such as in a portable computing device, like a laptop computer or a handheld computer.

The drives and their associated computer readable media illustrated in FIG. 1D provide nonvolatile storage of computer-executable instructions, data structures, program modules, and other data for computer or client device 102A. A number of program modules may be stored on hard disk 127, USB drive 129, optical disk 131, ROM 124, or RAM 137, including, but not limited to, a panistic inversion module 101, an alert module 110, and a simulation module 107. Program modules may include, but are not limited to, routines, subroutines, programs, objects, components, data structures, etc., which perform particular tasks or implement particular abstract data types.

A user may enter commands and information into the computer 106A through input devices, such as a keyboard 140 and a pointing device 142. Pointing devices may include a mouse, a trackball, and an electronic pen that can be used in conjunction with an electronic tablet. Other input devices (not shown) may include a joystick, game pad, satellite dish, scanner, or the like. These and other input devices are often connected to processing unit 121 through a serial port interface 146 that is coupled to the system bus 123, but may be connected by other interfaces, such as a parallel port, game port, a universal serial bus (USB), or the like.

The display 147 may also be connected to system bus 123 via an interface, such as a video adapter 148. As noted above, the display 147 can comprise any type of display devices such as a liquid crystal display (LCD), a plasma display, an organic light-emitting diode (OLED) display, and a cathode ray tube (CRT) display.

The camera 175 may also be connected to system bus 123 via an interface, such as an adapter 170. The camera 175 may comprise a video camera. The camera 175 can be a CCD (charge-coupled device) camera or a CMOS (complementary metal-oxide-semiconductor) camera. In addition to the monitor 147 and camera 175, the client device 100A, comprising a computer, may include other peripheral output devices (not shown), such as a printer.

The computer may also include a microphone 111 that is coupled to the system bus 123 via an audio processor 113 is understood by one of ordinary skill in the art. A microphone 111 may be used in combination with the voice recognition module 206 in order to process audible commands received from an operator.

The computer forming the central controller 106A may operate in a networked environment using logical connections to one or more remote computers, such as a web server. A remote computer 106B may be another personal computer, a server, a mobile phone, a router, a networked PC, a peer device, or other common network node. While the web server or a remote computer 106B typically includes many or all of the elements described above relative to the controller 106A, only a memory storage device 127B has been illustrated in this FIG. 1D. The logical connections depicted in FIG. 1D include a local area network (LAN) 142 and a wide area network (WAN) 142B. Such networking environments are commonplace in offices, enterprise-wide computer networks, intranets, and the Internet.

When used in a LAN networking environment, the computer forming the controller 106A is often connected to the local area network 142A through a network interface or adapter 153. When used in a WAN networking environment, the computer 106A typically includes a modem 154 or other means for establishing communications over WAN 142B, such as the Internet. Modem 154, which may be internal or external, is connected to system bus 123 via serial port interface 146. In a networked environment, program modules depicted relative to the server 102B, or portions thereof, may be stored in the remote memory storage device 127A. It will be appreciated that the network connections shown are exemplary and other means of establishing a communications link between the computers may be used.

Moreover, those skilled in the art will appreciate that the system 102 may be implemented in other computer system configurations, including hand-held devices, multiprocessor systems, microprocessor based or programmable consumer electronics, network personal computers, minicomputers, mainframe computers, and the like. The system 102 may also be practiced in distributed computing environments, where tasks are performed by remote processing devices that are linked through a communications network. In a distributed computing environment, program modules may be located in both local and remote memory storage devices.

Figure 2:
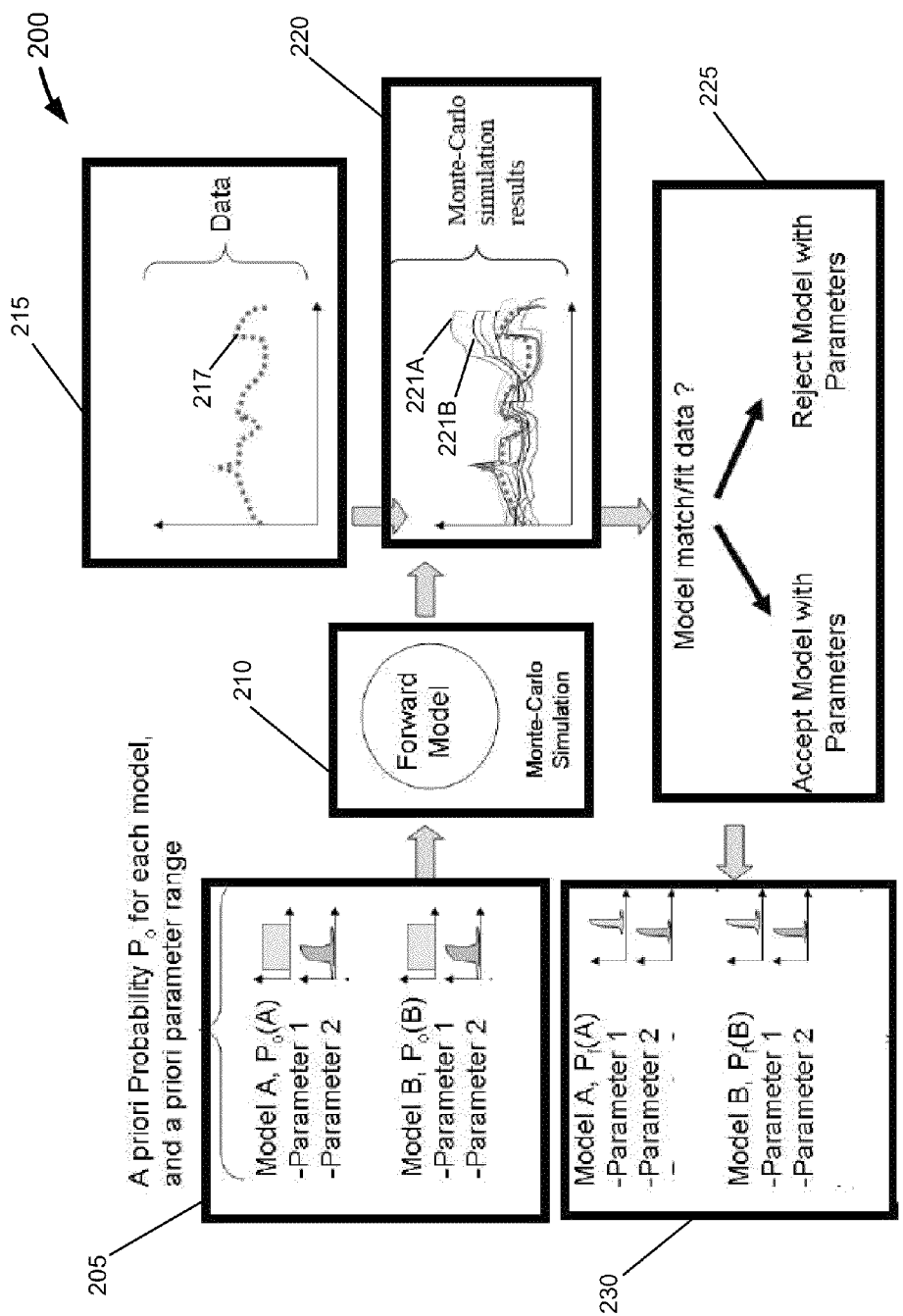
FIG. 2 is a diagram of a graphical overview of some steps for a method for controlling and monitoring a drilling operation using refined solutions from a panistic inversion.

FIG. 2 is a graphical overview of some steps 200 that form part a sub-method or routine 315 (illustrated in detail in FIG. 4) for generating a plurality of refined solutions from a panistic inversion. FIG. 2 generally corresponds with the sub-method 315 illustrated in FIG. 4 and described below. FIG. 2 also corresponds with the functions and calculations made by the panistic inversion and risk estimate module 101 of FIGS. 1A-1D.

Box 405 of FIG. 2 outlines two exemplary earth model representations for a desired geographic region that may be used for a drilling operation: earth model A and earth model B. Each earth model may comprise three and four layered type models as understood by one of ordinary skill in the art. Within each layer, several parameters may exist. For example, a first parameter 1 of the first earth model A and the second earth model B may comprise a ratio of horizontal formation resistivity ("Rh") value as understood by one of ordinary skill in the art. Meanwhile, each second parameter 2 of the first earth model A and second earth model B may comprise a resistivity anisotropy ratio defined for each layer within a particular model.

Each parameter within each earth model may comprise a predetermined range or distribution. For example, each first parameter of the first earth model A and the second earth model B may comprise an Rh value between about 0.2 and about 200 ohms per meter while the second parameter of the first earth model A and the second earth model B may comprise a resistivity anisotropy ratio between about 1 and about 10.

One of ordinary skill in the art recognizes that other earth models with different parameters may exist. Simple three layer earth models may be employed as well as complex earth layer models which can have at least up to six parameters. Parameters of these earth models may include, but are not limited to, Rh values, vertical formation resistivity ("Rv") values, upper and lower resistivity ("Ru" and "$R_L$") values, distances to upper and lower boundaries ("Hu" and "$H_L$"), bed thickness in layers, distance to shoulder beds, resistivity anisotropy ratios, two shoulder-bed resistivity values, etc. Such other earth models may be used with the system 102 and with method 300 without departing from the scope of the technology described herein.

Box 210 of FIG. 2 outlines a function of a panistic inversion. A panistic inversion includes an inversion scheme that outputs all the probable solutions that explain input data, noting that each of those solutions is usually associated with a probability. Equiprobable solutions may be used. Other solutions from a panistic inversion may comprise a posteriori probability.

A basic Monte-Carlo inversion is an example or an instance of a panistic inversion, as defined herein. With a basic Monte-Carlo inversion as understood by one of ordinary skill in the art, the solutions are often a function of a number of starting points that lead to the solution and/or function of the solution data. A Monte-Carlo inversion typically comprises a method that uses pseudorandom sampling to search a parameter space to retrieve earth models or other information about one or more unknowns of interest. Random sampling from highly non-uniform multidimensional distributions may be supported with a Monte-Carlo inversion.

As noted above, one exemplary panistic inversion may comprise a Monte-Carlo type inversion as understood by one of ordinary skill in the art. Other types of panistic inversions, besides the Monte-Carlo type, are included within the scope of the system 102 as understood by one of ordinary skill in the art.

For example, another panistic inversion, as defined herein, may include carrying out several traditional inversions. Each inversion may have a different starting point and each may result in a single best solution with associated uncertainties. These different best solutions may be combined (possibly accounting for each solution uncertainty) in order to provide an array of possible solutions. Each solution may have its own probability associated with it. These solutions may be used to quantify risks associated with a drilling operation.

With each earth model provided, a panistic inversion according to the inventive system produces a plurality of possible solutions for each model based on an input set of measurements. The input set of measurements may comprise data from the LWD module 120 or the MWD module 130 of the drilling system 104. Exemplary data from the LWD module 120 or the MWD module 130 may include phase measurements from a periscope tool. Box 215 of FIG. 2 outlines exemplary measured data plotted in a graph 217 that may be received from the LWD or MWD modules 120, 130.

The plurality of solutions produced by each panistic inversion using the data from box 215 as input is illustrated in box 220. Each curve 221 within box 220 may comprise a single solution of a plurality of solutions produced by the panistic inversion applied in box 210 to the input measured data contained within box 215.

Box 225 illustrates one exemplary embodiment of a refinement step or function in which it is determined if the earth model generated by the panistic inversion has produced a corresponding solution curve 221 that matches the input data from block 215 appropriately. If the solution curve 221 matches the input data from block 215 appropriately, the solution curve 221 is accepted and retained for control based calculations in a drilling operation. If the solution curve 221 does not match the input data from block 215 properly, the solution curve 221 is rejected and is no longer used in any further calculations for a drilling operation.

This matching of the solution curves 221 produced by the panistic inversions to the input data from box 215 may be based on geological knowledge, prior measurements of the desired geological area being drilled, and/or physics. As one simple example that is related to physics, one of ordinary skill in the art recognizes that oil is typically found above water in most earth formations. If a panistic inversion produced one or more solution curves 221 that have data showing that water was found on top of oil, then such solutions would be rejected by the system 102 as violating known geological physics of a desired geographic region.

Box 230 outlines the refined solution curves 221 from box 225 which are accepted and retained due to their matching with the data of box 215. These refined solution curves 221 may be used for control based calculations with respect to a drilling operation as will be described in further detail below.

Figure 3:
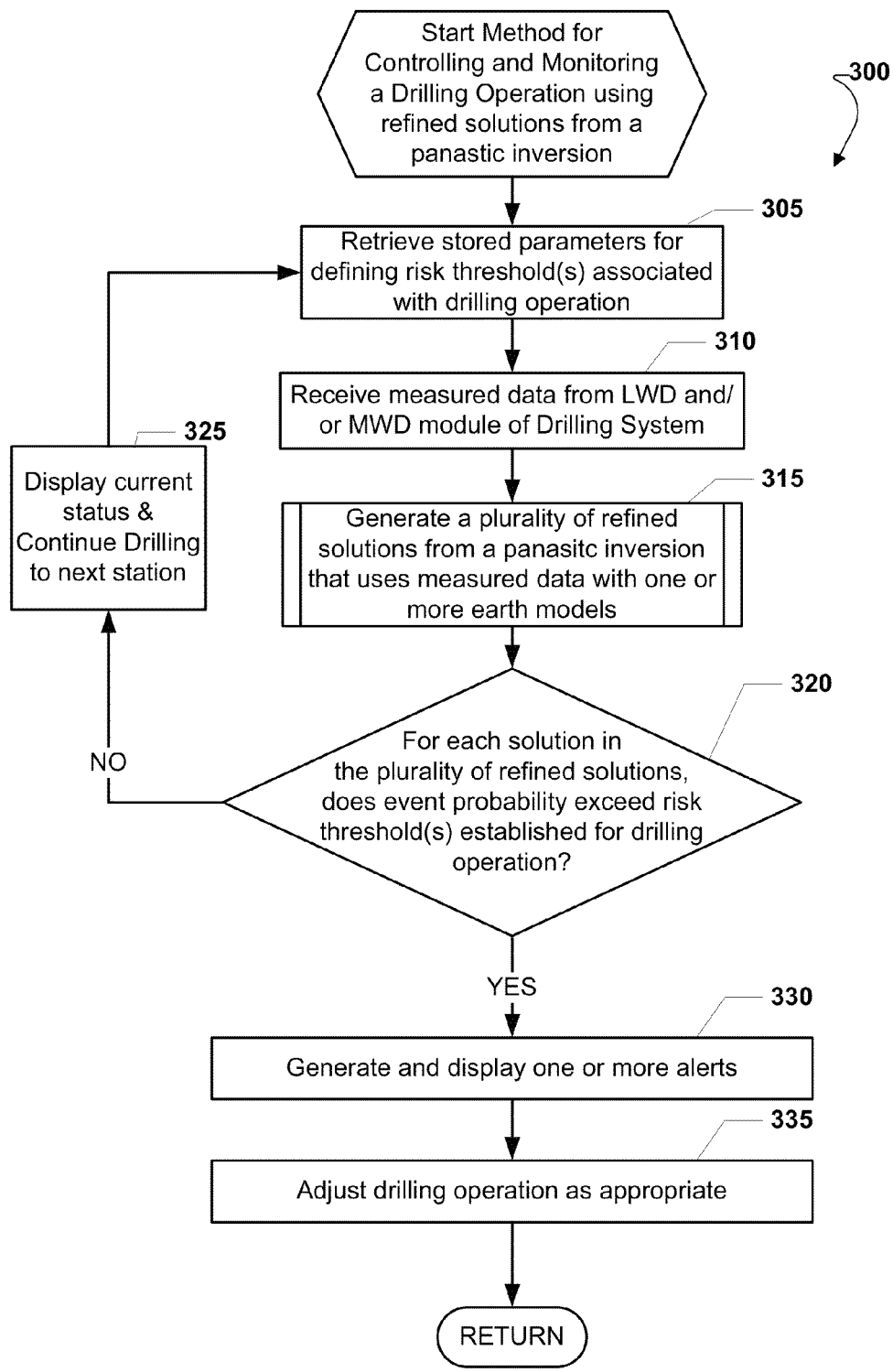
FIG. 3 is a flowchart illustrating a method for controlling and monitoring a drilling operation using refined solutions from a panistic inversion.

FIG. 3 is a flowchart illustrating a method 300 for controlling and monitoring a drilling operation using refined solutions from a panistic inversion. Block 305 is the first step in method 300. In block 305, the panistic inversion and risk estimate module 101 of FIG. 1A may retrieve stored parameters for defining one or more risk thresholds associated with a drilling operation. The stored parameters may exist in a memory storage device such as the hard disk drive 127A of the controller 106A as illustrated in FIG. 1D.

The stored parameters may relate to risk levels that are usually defined prior to drilling but may be defined and refined during a drilling operation. For example, one exemplary risk threshold may comprise activating an alarm or an alert when one of the solutions from the panistic inversion and risk estimate module 101 shows a layer of the earth model having a resistivity that is below a certain magnitude, such as below about 2 ohm meters. Other parameters besides resistivity and used for different risk thresholds are included within the scope of the system 102. Other parameters used for defining risk thresholds associated with drilling operations may include, but are not limited to, porosity, saturation, mineral composition, resistivity anisotropy ratios. These parameters for defining risk may be quantified based on at least the following, non-limiting list of parameters: the relative dip of an earth formation with respect to the axis of the measurement device, Rh values, vertical formation resistivity ("Rv") values, upper and lower resistivity ("Ru" and "$R_L$") values, distances to upper and lower boundaries ("Hu" and "$H_L$"), bed thickness in layers, distance to shoulder beds, resistivity anisotropy ratio, two shoulder-bed resistivity values, etc.

Next, in block 310, measured data from the log while drilling ("LWD") and/or measure while drilling ("MWD") modules 120, 130 may be received with the panistic inversion and risk estimate module 101. In routine or sub-method block 315, the panistic inversion and risk estimate module 101 may generate a plurality of refined solutions from a panistic inversion, such as one using a Monte-Carlo type inversion as understood by one of ordinary skill the art. Further details of routine block 315 will be described below in connection with FIG. 4. Routine block 315 generates a plurality of mathematical solutions that are refined or paired down based on local geological knowledge, prior measurements of the desired geographic area being drilled, and/or physics as will be described in further detail below.

Subsequently, in decision block 320, the panistic inversion and risk estimate module 101 decides for each solution in the plurality of refined solutions, whether an event probability exceeds the risk threshold(s) establish for a drilling operation as retrieved in block 305. For example, a defined risk threshold stored in a memory storage device like the hard disk drive 127A of FIG. 1D may comprise the following: does each solution from the panistic inversion calculations of routine block 315 show a probability of greater than or equal to 10% that the drillbit 105 of FIG. 1B that is within about 5 feet of an earth layer having a resistivity below 2 ohm meter.

As understood by one of ordinary skill in the art, this risk threshold may comprise one of many (several) that may be stored and accessed from the hard disk drive 127A of FIG. 1D. The probability numbers for the risk thresholds may be adjusted upward or downward prior to drilling and during a drilling operation as appropriate.

If the inquiry to decision block 320 is negative (meaning that the current drilling operation has not exceeded an established risk threshold), then the "NO" branch is followed back to block 325 in which the panistic inversion and risk estimate module 101 may display current status information 115A with the display device 147. For example, the display device 147 may include information on distance to boundaries as well as resistivities for the formation layer and of the shoulder beds and their orientation. The display device 147 may also project structural maps of the well in real-time. In this block 325, the panistic inversion and risk estimate module 101 may allow the drilling operation to continue to the next station. If the inquiry to decision block 320 is positive (meaning that the current drilling operation has met or exceeded an established risk threshold), then the "YES" branch is followed to block 330.

In block 330, the panistic inversion and risk estimate module 101 may generate and display one or more alerts 110A on the display device 147. These alerts may be visual or aural in nature or both. In addition to displaying an alert 110A that may comprise an alphanumeric text based message such as "DRILLING OPERATION STOPPED," the panistic inversion and risk estimate module 101 may also display current status information such as the magnitude of the current probability calculations that have exceeded the defined risk threshold(s). The display device 147 at this stage 330 of the method 300 may include information positioned adjacent to the alert such as the distance to boundaries, resistivities for the formation layer, and resistivities of the shoulder beds and their orientation. The display device 147 may project the current structural map of the well just prior to the stopping of the drilling operation.

As understood by one of ordinary skill in the art, the controller 106 may alert other portable computing devices that are coupled to the communications network 142. For example, in addition to displaying an alert 110A on the display device 147 of the controller 106, the controller 106 may also transmit messages to other portable computing devices coupled to the communications network 142 such as remote smart phones, pagers, computers, etc. The controller 106 may transmit these messages over the communications network 142 as e-mails, text messages, recorded machine generated voicemails, and the like.

Next, in block 335, the panistic inversion and risk estimate module 101 may adjust a drilling operation as appropriate based on the risk threshold(s) assigned prior to and during the drilling operation. For example, the panistic inversion and risk estimate module 101 may trigger an alert for automatically geo-steering the drill string 12 and/or geo-stopping the drill string 12. The panistic inversion and risk estimate module 101 may also be used to generate one or more alerts for assessing geomechancial risks with respect to the equipment illustrated in FIGS. 1B and 1C as well as providing information about directional drilling risks.

The panistic inversion and risk estimate module 101 may generate alerts as well as initiate control events as part of the alerts. For example, in the example provided above with respect to a solution from the panistic inversion that shows a probability of greater than or equal to 10% that the drillbit 105 of FIG. 1B that is within about 5 feet of an earth layer having a resistivity below 2 ohm meter, various risk thresholds may be established for triggering alerts or warnings as well as triggering control events.

A risk threshold may be provided that causes the panistic inversion and risk estimate module 101 to alert an operator of the drilling operation that the current drilling operation is approaching a risk threshold but has not exceeded it yet. So for example, a first risk threshold may be defined as follows: for each solution from the panistic inversion that shows a probability of greater than or equal to 9% that the drillbit 105 of FIG. 1B that is what within about 5 feet of an earth layer having a resistivity below 2 ohm meter will trigger only a warning that comprises an alphanumeric text message.

A second risk threshold corresponding to this first risk threshold may be defined as follows: for each solution from the panistic inversion that shows a probability of greater than or equal to 10% that the drillbit 105 of FIG. 1B that is within about 5 feet of an earth layer having a resistivity below 2 ohm meter, then activate a control event such as stopping the drilling operation and display an alphanumeric text based message stating, "DRILLING OPERATION HAS BEEN STOPPED." This message may be transmitted to the display 147 of the controller 106 of FIG. 1D or to a display of another portable computing device, like a mobile telephone or personal digital assistant ("PDA").

As understood by one of ordinary skill in the art, the number and types of risk thresholds for generating warning messages as well as activating control events, such as steering and/or stopping a drilling operation, are within the scope of the system 102. The method 300 then returns back to block 305.

Figure 4:
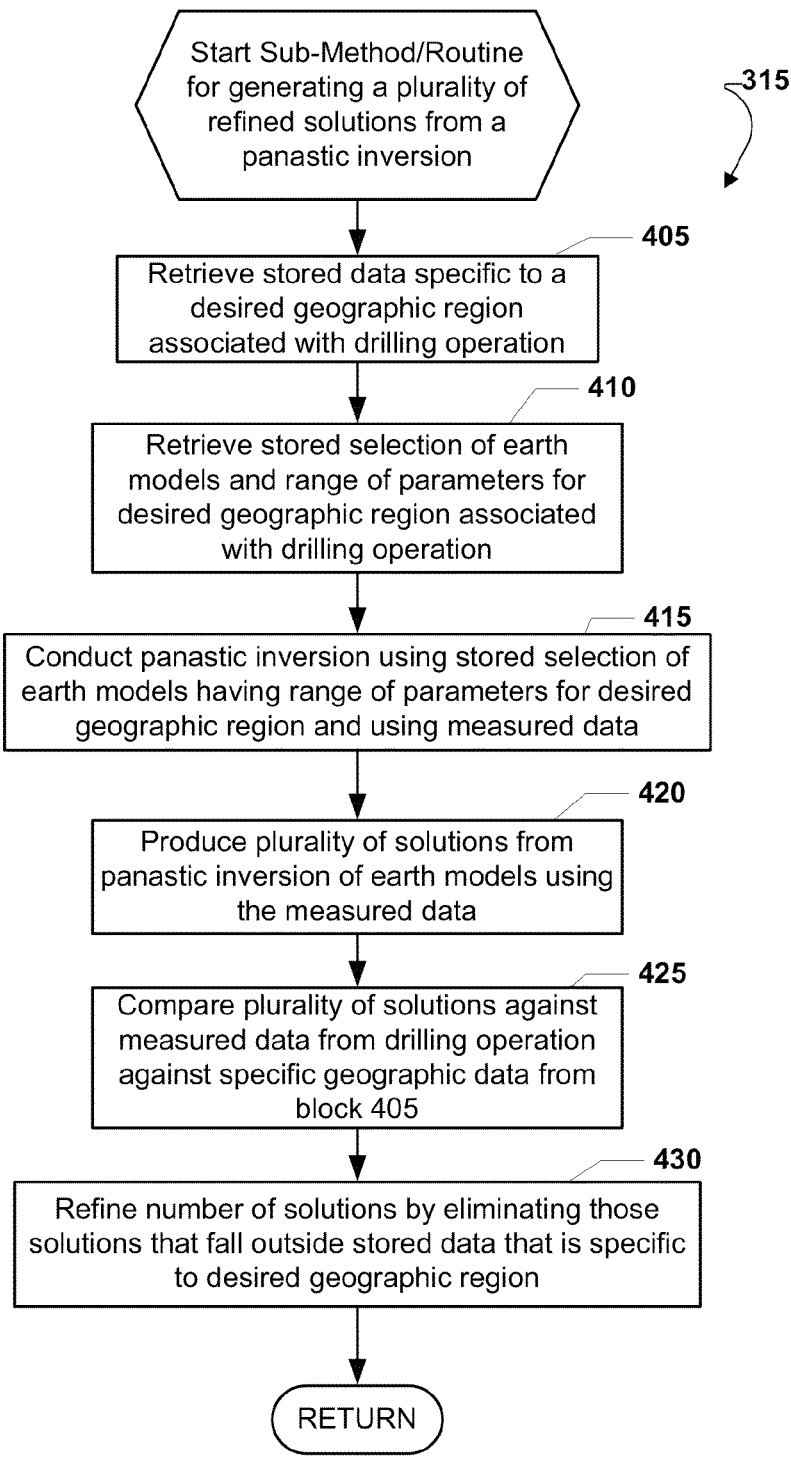
FIG. 4 is a flowchart illustrating a sub-method or routine of FIG. 3 for generating a plurality of refined solutions from a panistic inversion.

FIG. 4 is a flowchart illustrating a sub-method or routine 315 of FIG. 3 for generating a plurality of refined solutions from a panistic inversion. This flowchart of FIG. 4 generally corresponds with the graphical overview illustrated in FIG. 2 and described above. Therefore, references to FIG. 2 will be made below in the discussion of the flowchart of FIG. 4.

Block 405 is the first step of the routine 315 illustrated in FIG. 3. In block 405, the panistic inversion and risk estimate module 101 may retrieve stored data that is specific to a desired geographic region associated with a drilling operation. The stored data retrieved in block 405 may exist on a storage device such as the hard disk drive 127A of FIG. 1D. The stored data may comprise local geological knowledge about the desired geographic area, prior measurements of the desired geographic area being drilled, and/or physics. As an elementary example of physics parameters that stored on the hard disk drive 127A, a parameter or rule may be provided that states that oil is typically found above water in most earth formations. And for any mathematical solution that shows data that reflects that water is found above an oil bed may be rejected.

Next, in block 410, the panistic inversion and risk estimate module 101 may retrieve a stored selection of earth models having ranges of parameters for the desired geographic region associated with a drilling operation. These earth models may be stored in a storage device such as the hard disk drive 127A of FIG. 1D. Block 410 generally corresponds with block 205 of FIG. 2 as described above.

Each earth model may comprise three and four layered type models as understood by one of ordinary skill in the art. Within each layer, several parameters may exist. For example, a first parameter 1 of the first earth model A and the second earth model B illustrated in FIG. 2 may comprise a ratio of horizontal formation resistivity ("Rh") value as understood by one of ordinary skill in the art. Meanwhile, each second parameter 2 of the first earth model A and second earth model B may comprise a resistivity anisotropy ratio defined for each layer within a particular model.

Each parameter within each earth model may comprise a predetermined range or distribution. For example, each first parameter of the first earth model A and the second earth model B may comprise an Rh value between about 0.2 and about 200 ohms per meter while the second parameter of the first earth model A and the second earth model B may comprise a resistivity anisotropy ratio between about 1 and about 10.

As noted above in the description of FIG. 2, one of ordinary skill in the art recognizes that other earth models with different parameters may exist. Simple three layer earth models may be employed as well as complex earth layer models which can have at least up to six parameters. Parameters of these earth models may include, but are not limited to, Rh values, vertical formation resistivity ("Rv") values, upper and lower resistivity ("Ru" and "$R_L$,") values, distances to upper and lower boundaries ("Hu" and "$H_L$"), bed thickness in layers, distance to shoulder beds, resistivity anisotropy ratios, two shoulder-bed resistivity values, etc. Such other earth models may be used with the system 102 and with method 300 without departing from the scope of the technology described herein.

Next, referring back to FIG. 4, in block 415, the panistic inversion and risk estimate module 101 may execute a panistic inversion using a Monte-Carlo type on each earth model retrieved in block 405 and using the measured data received in block 310 of FIG. 3. As noted previously, the Monte-Carlo type of panistic inversion is but one type of panistic inversion that may be used in the system 102. Other types of panistic inversions are included within the scope of the system 102. Block 415 generally corresponds to block 210 of FIG. 2.

In block 420, a plurality of solutions may be generated by the panistic inversion and risk estimate module 101 based on the panistic inversion conducted in block 415 using the measured data from block 310 of FIG. 3. Block 415 generally corresponds with block 220 of FIG. 2 which illustrates a plurality of solution curves 221 based on the input data received from block 215.

Next, in block 425, each solution or solution curve 221 (See Block 220 of FIG. 2) is compared against the raw measured data received from block 310 of FIG. 3 and against the stored data specific about the local geographic region retrieved in block 405. In this block 425 of FIG. 4 which generally corresponds with block 225 of FIG. 2, the panistic inversion and risk estimate module 101 is using the specific local geographic region knowledge retrieved in block 405 as a baseline from which to compare the solutions against. Any solution from the panistic inversion that falls significantly outside or away from the baseline or does not make sense when compared to a parameter which may be based on physics, such solutions may be earmarked or flagged to be removed from further consideration and/or use by the panistic inversion and risk estimate module 101.

In block 430, the panistic inversion and risk estimate module 101 may refine the number of solutions generated by the panistic inversion by eliminating those solutions which fall outside the specific local geographic region knowledge retrieved in block 405. This block 430 generally corresponds to the remaining solution sets illustrated in block 230 of FIG. 2. The sub-method or routine 315 then returns to decision block 320 of FIG. 3.

Figure 5:
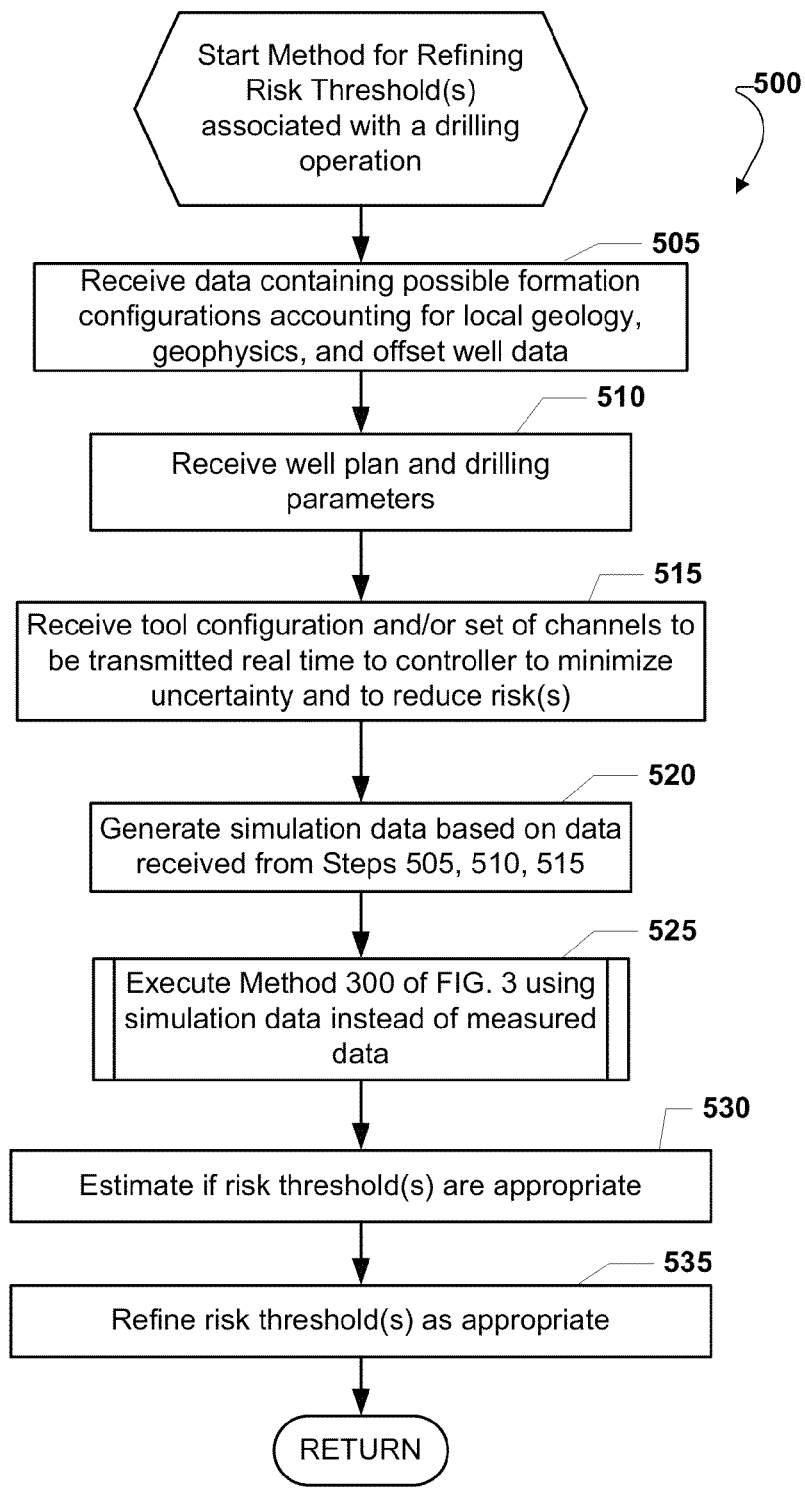
FIG. 5 is a flowchart illustrating a method for refining risk threshold(s) associated with a drilling operation.

FIG. 5 is a flowchart illustrating a method 500 for refining risk threshold(s) associated with a drilling operation. Block 505 is the first step of method 500. In block 505, a simulation module 107 may receive data containing possible earth formation configurations accounting for local geology, geophysics, and offset well data for a desired geographic region selected for a drilling operation. This data generally corresponds to geologic settings and operational conditions for a drilling operation as understood by one of ordinary skill the art. This data may be stored on a storage device such as the hard disk drive 127A in FIG. 1D.

Next, in block 510, the simulation module 107 may receive well plan and drilling parameters for a desired geographic region. Such parameters may include, but are not limited to, shared earth model data that may combine the earth models of reservoir engineers, geophysicists, and petroleum geologists to simulate a reservoir. The parameters may include those that relate to structural geology, formation markers, pressures, rock strength, earth stress information, and records of trouble zones.

Subsequently, in block 515, the simulation module 107 may receive tool configuration data and/or a set of channels to be transmitted in real time to the controller 95 in order to minimize uncertainty and to reduce risk(s) during a drilling operation managed by the system 102. Tool configuration data may include, but is not limited to, parameters such as a number and position of receivers/transmitters present within the LWD tools 120, the radio-frequencies used by the LWD and MWD tools 120, 130, etc. The set of channels may comprise a selection of data to be transmitted in real-time and that would be used as the input of the Monte-Carlo panistic inversion used by the panistic inversion and risk estimate module 101. This selection of data to be transmitted in real-time may be important in many cases especially when mud pulse telemetry may be used and due to the intrinsic limitation and bandwidth for many underground telemetry techniques.

Next, in block 520, the simulation module 107 may generate simulation data for the desired geographic region associated with the drilling operation based on the data received in blocks 505, 510, and 515. In routine or sub-method block 525, the method 300 of FIG. 3 for controlling and monitoring a drilling operation using refine solutions from a panistic inversion may be utilized in which the data for block 310 of FIG. 3 will originate from the data produced by the simulation module 107. In other words, instead of using measured data from the LWD and MWD modules 120, 130 as noted in block 310, the panistic inversion and risk estimate module 101 will utilize the simulation data produced by the simulation module 107 in block 520.

Next, in block 530, the risk threshold(s) established for the panistic inversion method 300 of FIG. 3 may be reviewed and determine if they are at appropriate magnitudes. In this block 530, the simulation module 107 may determine if too many alerts and/or warnings were activated during the simulated drilling operation conducted in block 525 which utilize the method 300 of FIG. 3. If too many of alerts and/or warnings were issued during the simulation run by the simulation module 101, then in block 535 the magnitude of the risk threshold(s) may be adjusted appropriately, such as up word or downward depending upon the condition or risk(s) being monitored and detected.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). A portable computing device may include a cellular telephone, a pager, a PDA, a smartphone, a navigation device, or a hand-held computer with a wireless connection or link.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). A portable computing device may include a cellular telephone, a pager, a PDA, a smartphone, a navigation device, or a hand-held computer with a wireless connection or link.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the disclosure. In some instances, certain steps may be omitted or not performed without departing from the invention. Further, words such as "thereafter", "then", "next", etc. are not intended to limit the order of the steps. These words are simply used to guide the reader through the description of the exemplary methods described herein.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for monitoring a drilling operation comprising:
    placing a drilling tool into a wellbore for the drilling operation;
    obtaining measured data from the drilling tool corresponding to a property of the wellbore, wherein the measured data relates to one or more characteristics of materials along a trajectory of the wellbore at a plurality of depths;
    receiving one or more parameters for defining a probability risk threshold associated with the drilling operation;
    generating a plurality of mathematical solutions from a panistic inversion that uses the measured data and one or more earth models;
    determining if the measured data exceeds the probability risk threshold associated with the drilling operation based at least in part on the plurality of mathematical solutions from the panistic inversion; and
    activating a control event related to an operation of the drilling tool within the wellbore if the measured data exceeds the probability risk threshold associated with the drilling operation.

2. The method of claim 1, further comprising comparing the plurality of mathematical solutions against data that is specific to a desired geographic region and associated with the drilling operation.

3. The method of claim 2, wherein the data that is specific to a desired geographic region comprises at least one of local geological knowledge about the desired geographic region, prior measurements of the desired geographic region being drilled, and geological physics.

4. The method of claim 2, further comprising refining a number of the plurality of mathematical solutions by eliminating those solutions which are substantially outside of the data specific to the desired geographic region.

5. The method of claim 2, further comprising setting the probability risk threshold based on the parameters associated with a drilling operation before the drilling operation has commenced.

6. The method of claim 1, wherein the panistic inversion comprises a Monte-Carlo type inversion.

7. The method of claim 1, wherein the control event is an alert comprising at least one of an audible and visual alert produced on a portable computing device.

8. The method of claim 1, wherein the control event relates to at least one of a geo-steering, geo-stopping, a geomechanical risk, and a directional drilling risk.

9. The method of claim 1, further comprising if the measured data exceeds the probability risk threshold associated with the drilling operation, then automatically activating a control event which impacts the drilling operation.

10. The method of claim 9, wherein the control event relates to at least one of a geo-steering and geo-stopping.

11. A system for monitoring a drilling operation comprising:
 a drilling tool configured to be disposed within a wellbore for the drilling operation and configured to obtain measured data corresponding to a property of the wellbore, wherein the measured data relates to one or more characteristics of materials along a trajectory of the wellbore at a plurality of depths; and
 a processor configured to:
 receive one or more parameters for defining a probability risk threshold associated with the drilling operation;
 receive the measured data from the drilling tool disposed within the wellbore for the drilling operation;
 generate a plurality of mathematical solutions from a panistic inversion that uses the measured data and one or more earth models;
 determine if the measured data exceeds the probability risk threshold associated with the drilling operation; and
 generate an alert related to an operation of the drilling tool within the wellbore if the measured data exceeds the probability risk threshold associated with the drilling operation.

12. The system of claim 11, further comprising means for comparing the plurality of mathematical solutions against data that is specific to a desired geographic region and associated with the drilling operation.

13. The system of claim 12, wherein the data that is specific to a desired geographic region comprises at least one of local geological knowledge about the desired geographic region, prior measurements of the desired geographic region being drilled, and geological physics.

14. The system of claim 12, further comprising means for refining a number of the plurality of mathematical solutions by eliminating those solutions which are substantially outside of the data specific to the desired geographic region.

15. The system of claim 11, wherein the alert comprises at least one of an audible and visual alert produced on a portable computing device.

16. The system of claim 11, wherein the alert relates to at least one of a geo-steering, geo-stopping, a geomechanical risk, and a directional drilling risk.

17. A system for monitoring and controlling a drilling operation comprising:
 a drilling system configured to be disposed within a wellbore, the drilling system comprising a logging and control module for tracking measured data, wherein the measured data corresponds to a property of the wellbore and is related to one or more characteristics of materials along a trajectory of the wellbore at a plurality of depths; and
 a controller coupled to the drilling system and configured to receive the measured data from the drilling system, the controller comprising a panistic inversion module, wherein the panistic inversion module generates a plurality of mathematical solutions from a panistic inversion that uses the measured data and one or more earth models, and wherein the panistic inversion module is configured to determine if the measured data exceeds a probability risk threshold associated with the drilling operation for each solution of the plurality of mathematical solutions from the panistic inversion, and wherein the controller is configured to control an operation of the drilling system within the wellbore if the measured data exceeds the probability risk threshold associated with the drilling operation.

18. The system of claim 17, wherein the panistic inversion module generates an alert if the measured data exceeds the probability risk threshold associated with the drilling operation.

19. The system of claim 18, wherein the alert relates to at least one of a geo-steering, geo-stopping, a geomechanical risk, and a directional drilling risk.

20. The system of claim 17, wherein the panistic inversion module uses a Monte-Carlo type inversion.

* * * * *